United States Patent [19]
Sega et al.

[11] Patent Number: 5,416,658
[45] Date of Patent: May 16, 1995

[54] INFORMATION STORAGE DEVICE USING A ROTARY RECORDING MEDIUM

[75] Inventors: Masahiko Sega, Hiratsuka; Jiro Kaneko, Minami-ashigara; Tsuyoshi Takahashi, Odawara, all of Japan

[73] Assignee: Hitachi, Ltd., Tokyo, Japan

[21] Appl. No.: 67,106

[22] Filed: May 26, 1993

[30] Foreign Application Priority Data

Jun. 4, 1992 [JP] Japan .................................. 4-144099
Mar. 18, 1993 [JP] Japan .................................. 5-058945

[51] Int. Cl.⁶ .......................... G11B 5/55; G11B 33/08
[52] U.S. Cl. ....................................................... 360/106
[58] Field of Search ............................... 360/105–106, 360/109

[56] References Cited

U.S. PATENT DOCUMENTS

| | | | |
|---|---|---|---|
| 3,643,242 | 2/1972 | Bryer | 360/106 X |
| 3,769,467 | 10/1973 | Gabor | 360/106 |
| 4,237,504 | 12/1980 | Ho et al. | 360/106 |
| 4,571,649 | 2/1986 | Goss | 360/106 |
| 4,603,363 | 7/1986 | Rickert et al. | 360/97.12 |
| 4,754,349 | 6/1988 | Nishida et al. | 360/99.01 |
| 4,812,932 | 3/1989 | Hishinuma et al. | 360/97.01 |
| 5,146,122 | 9/1992 | Hearn et al. | 360/105 X |

FOREIGN PATENT DOCUMENTS 1-39685 2/1989 Japan .

*Primary Examiner*—John H. Wolff
*Attorney, Agent, or Firm*—Kenyon & Kenyon

[57] ABSTRACT

Degradation of a detector-head positioning in an information storage device using a rotary recording medium may be prevented. A reaction force which gives a vibration to a positioning mechanism in a magnetic disk drive generally occurs when the detector heads seek a destination track on a rotary recording medium. This vibration or impact may be decreased or eliminated if an actuator magnet is supported on a linear-slider member or a rotary-slider member. Sliding motion is received with a pneumatic spring to softly result in no vibration being transmitted to the spindle or other positioning mechanism. The pneumatic spring can drastically reduce a proper vibration frequency of the positioning mechanism (magnetic-circuit support) to such an extent that an electrical servo system can catch the vibration frequency and can hold down a location error. Even if a reaction force is too big to prevent resonance from being caused, the pneumatic spring can quickly attenuate the reaction force using its own throttle hole. In case the magnetic disk drive is fixed on an incline or a slant, another spring between a magnetic circuit and a housing can regulate a positional relationship relative to peripheral members including the actuator.

15 Claims, 7 Drawing Sheets

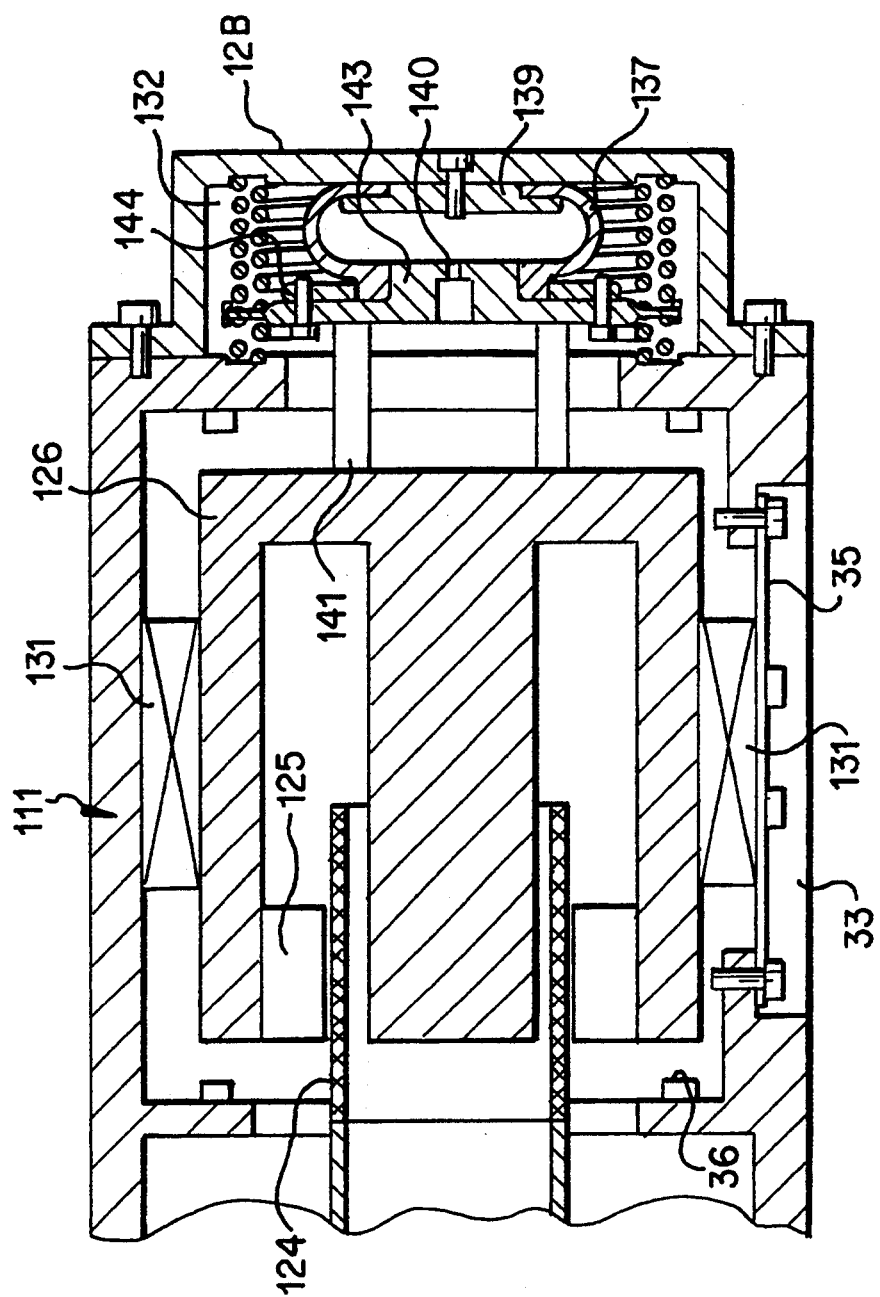

INFORMATION STORAGE DEVICE USING A ROTARY RECORDING MEDIUM

BACKGROUND OF THE INVENTION

The present invention relates to an information storage device which uses a magnetic disk device, an optical disk device or any other rotary recording medium. More specifically, the present invention relates to improvements in a head positioning mechanism for detecting information in such devices.

Information storage devices such as magnetic disk devices, optical disk devices and magnetooptical disk devices have heretofore been used as external memory devices for electronic computers and image processors. Among such devices, information storage devices have been known in which a disk of a medium for recording information is rotated, and a head is moved to detect information on the disk, in order that the detection head writes information onto any position on the disk surface or reads information from any position on the disk surface.

FIG. 7 shows the structure of, for instance, such a magnetic disk device. In this magnetic disk device, the head is positioned by linearly moving the carriage and by moving the head in the radial direction of the disk that is rotating. The disks a are fitted and secured to a spindle b which is held by spindle bearings d fitted to a housing c. A spindle motor e is installed on the housing and has its shaft coupled to the spindle. The heads f are mounted on guide arms g via gimbals. The guide arms g are installed on a carriage h. Rollers in the carriage h roll on the rails in the housing, enabling the heads to move in a radial direction of the disks. The driving is accomplished by an actuator that has a coil i and a magnet. The coil i is mounted on the carriage h, and the magnet is secured to the housing c together with a yoke j that carries the magnet. The carriage attains the aforementioned linear motion due to the electromagnetic action caused by the coil and the magnet.

In such a magnetic disk device, when the carriage h is moved by the electromagnetic action caused by the coil and the magnet, the magnet and the yoke j supporting the magnet receive the reaction force. Since the yoke j is directly secured to the housing c, the reaction force is directly transmitted to the housing c and is further transmitted to the spindle b via the spindle bearings d.

Since the spindle bearings d have a relatively small rigidity, a spring-mass system is established in which the spindle bearings d serve as springs and the spindle b serves as a mass, whereby the spindle b vibrates together with the disks a (hereinafter this phenomenon will be called spindle vibration).

Since the spindle bearing d has almost no viscosity, the vibration crest becomes high at the resonance frequency of the spring-mass system, whereby the carriage h is no longer capable of sufficiently following the vibration, resulting in the occurrence of a head location error. FIG. 8 shows the relationship between the spindle vibration and the positioning precision of the head, showing the vibration frequency as the abscissa and the displacement of the head, i.e., the head location error as the ordinate.

In the above-mentioned magnetic disk device, in other words, when the excitation frequency component due to the reaction force of the actuator comes to agree with a proper vibration frequency of the spindle, the resonance crest (curve A) becomes high since the spindle bearing has a small viscosity. Additionally, the positioning precision of the head decreases.

SUMMARY OF THE INVENTION

In order to prevent the spindle vibration and to improve the positioning precision of the head according, for example, to Japanese Patent Laid-Open No. 39685/1989, a magnetic circuit consisting of a magnet and a yoke on the housing of the actuator is supported by a leaf spring and a shearing rubber damper. Besides, proper vibration frequencies of such members (spindle vibration frequencies) are lowered (from curve A to curve B in FIG. 8) in order to achieve the above-mentioned object.

According to U.S. Pat. No. 3,643,242, a member of the actuator on the housing is supported to move in the same direction as that in which the head performs the seeking operation, and is further coupled to a diaphragm in the housing. This makes it possible to suppress undesired motions of the members of the housing (to suppress any residual creeping motion of the stator) by the diaphragm. During the normal operation, however, the motion of the stator is not stopped. That is, no attention has been given to the relationship between the vibration frequency and the location error shown in FIG. 8.

Problems involved in the above-mentioned prior art will now be described.

According to the magnetic disk device disclosed in Japanese Patent Laid-Open No. 39685/1989, the member of the actuator on the housing, i.e., the top and bottom of the magnetic circuit support, is held by resilient members such as shearing dampers and the sides are supported by leaf springs in a hanging manner in the housing.

The present inventors have discovered the fact that even if the proper vibration (not vibration frequency) of the magnetic circuit support could be decreased (from curve A to curve B in FIG. 8), the proper vibration frequency of the spindle is still higher than that of the magnetic circuit support (see an extreme value of the curve B of FIG. 8), and that the carriage cannot still follow the spindle vibration. The present inventors have further discovered that by such a structure using leaf springs, it is not possible to decrease the proper vibration frequency of the magnetic circuit support due to the amplitudes and spring constants of the leaf springs, imposing a limitation on the improvement of the positioning precision of the head.

In the magnetic disk device taught in U.S. Pat. No. 3,643,242, the member of the actuator on the housing, i.e., the magnetic circuit support, is supported by a linear bearing, making it possible to increase the amplitude at low frequencies compared with that of the magnetic disk device disclosed in Japanese Patent Laid-Open No. 39685/1989.

However, the diaphragm has poor attenuation characteristics, and the amplitude becomes several times in ordinary amplitude when the reaction force is applied thereto from the actuator. When the amplitude becomes too great, the diaphragm is deformed in an unexpected direction. Thereby the spring constant suddenly increases, the acceleration of vibration transferred to the housing rapidly changes, and the positioning precision of the head is deteriorated.

The present invention relates to an information storage device which features improved head positioning precision as a result of decreasing the effect of vibration of members of which consists of the head actuator on the housing.

In order to achieve the above-mentioned features, the present invention provides as an embodiment a magnetic disk drive which comprises disks, a drive mechanism which support and rotate the disks, a head assembly including heads for writing information onto and reading information from the disks, a mechanism that supports the head assembly, a guide mechanism that guides the support mechanism so that the heads move on the disks, and a housing supporting these mechanisms. The present invention further provides a head actuator in which one of a coil or a magnet for moving the heads is supported by the support mechanism and the other is supported by the housing, a second guide mechanism that gives the freedom of motion to the magnet or the coil in a direction which is the same as or opposite to the direction in which the support mechanism moves, a pneumatic spring with a throttle for attenuating the vibration so that the coil or magnet may not be vibrated by a force generated between the coil and the magnet accompanying the motion of the head, and a spring which restricts or regulates a relative positional relationship between the support member supporting the magnet or the coil and the housing and other peripheral members.

When an electric current flows through the coil of the actuator, a mechanism such as a carriage or a swing arm which supports the head assembly attains a linear or swinging motion due to the electromagnetic action between the coil and the magnet, and gives a motion necessary for positioning the head.

As the actuator operates, the coil on the head support mechanism gives a reaction force to a member (magnet) of the actuator on the housing. However, the second guide mechanism greatly releases the reaction force of the vibration that is transmitted via the housing to such members as the spindle and the spindle bearing constituting the disk drive mechanism. Therefore, no spindle vibration is generated, and the head positioning precision is improved.

In the magnetic disk device of an embodiment according to the present invention, furthermore, the second guide mechanism and the pneumatic spring with a throttle make it possible to lower the proper vibration frequency of the magnetic circuit support (member of the actuator on the housing) and to realize the characteristics of curve C shown in FIG. 8. Here, by also utilizing high compression characteristics of a servo system which is capable of following the vibration of a low frequency as low as several tens of Herzs or lower, the carriage is permitted to follow the vibration of the spindle and the housing, enabling the head positioning precision to be improved.

Moreover, even when a reaction force is generated that is large enough to cause resonance of the magnetic circuit, a large damping force obtained by the throttle of the pneumatic spring quickly attenuates the vibration caused by the reaction force. It is therefore allowed to minimize the marginal size for the amplitude of the vibration of the coil or the magnet, to decrease the gaps between the coil or the magnetic circuit and other parts, and to decrease the cost and the size of the device.

In addition, a spring disposed between the magnetic circuit of the actuator and the housing restricts or regulates at all times a relative positional relationship between the magnetic circuit and the peripheral members provided in the range in which the member can move. Therefore, even when the whole device is tilted, no impact is generated by the interference of the members; i.e., there is no harmful effect of vibration caused by the reaction force when the head performs a seeking operation. The head can therefore be positioned with a very high precision.

BRIEF DESCRIPTION OF THE DRAWINGS

FIG. 3b is a side view of the carriage and members of FIG. 3a.

FIG. 9 is a partial sectional view illustrating the magnetic disk device of FIG. 4.

DETAILED DESCRIPTION

A magnetic disk device according to an embodiment of the present invention will now be described with reference to the drawings.

Figure 1:
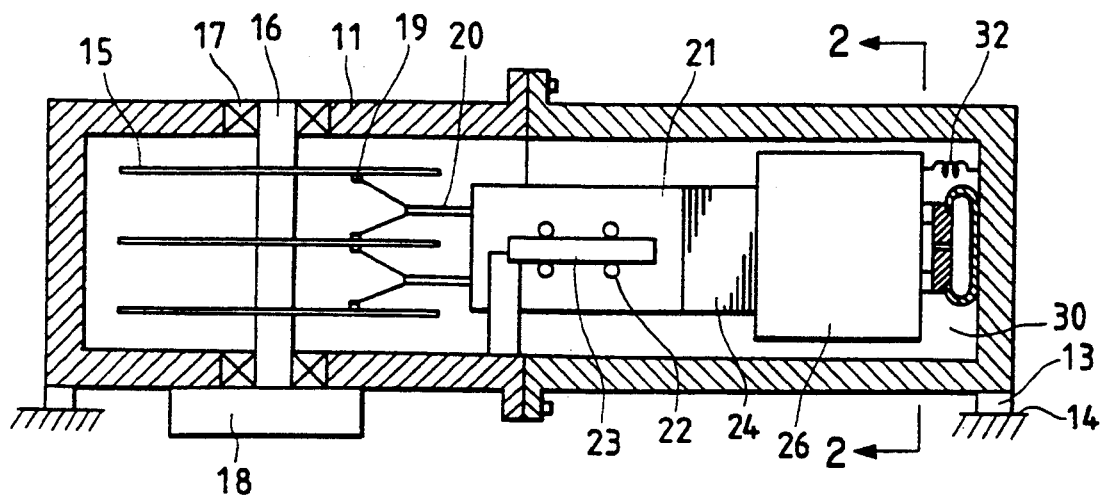
FIG. 1 is a sectional view illustrating a magnetic disk device according to an embodiment of the present invention.
Figure 2:
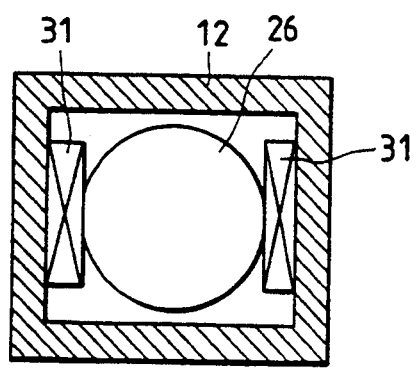
FIG. 2 is a sectional view taken along the line A—A of FIG. 1.

(A) FIGS. 1 and 2 illustrate a magnetic disk device in which a head linearly moves in a radial direction of a disk.

A housing 11 is installed on a device frame 14 via vibration-isolating rubbers 13. The housing 11 comprises two parts which are fastened together by bolts. The housing contains disks 15, a drive mechanism (16 to 18) that supports and rotates the disks 15, a head assembly including heads 19 that write information onto and read information from the disks, a carriage 21 that supports the head assembly, and mechanisms (22, 23) that support the carriage so that the heads move on the disks.

Details are described below.

Figure 3A:
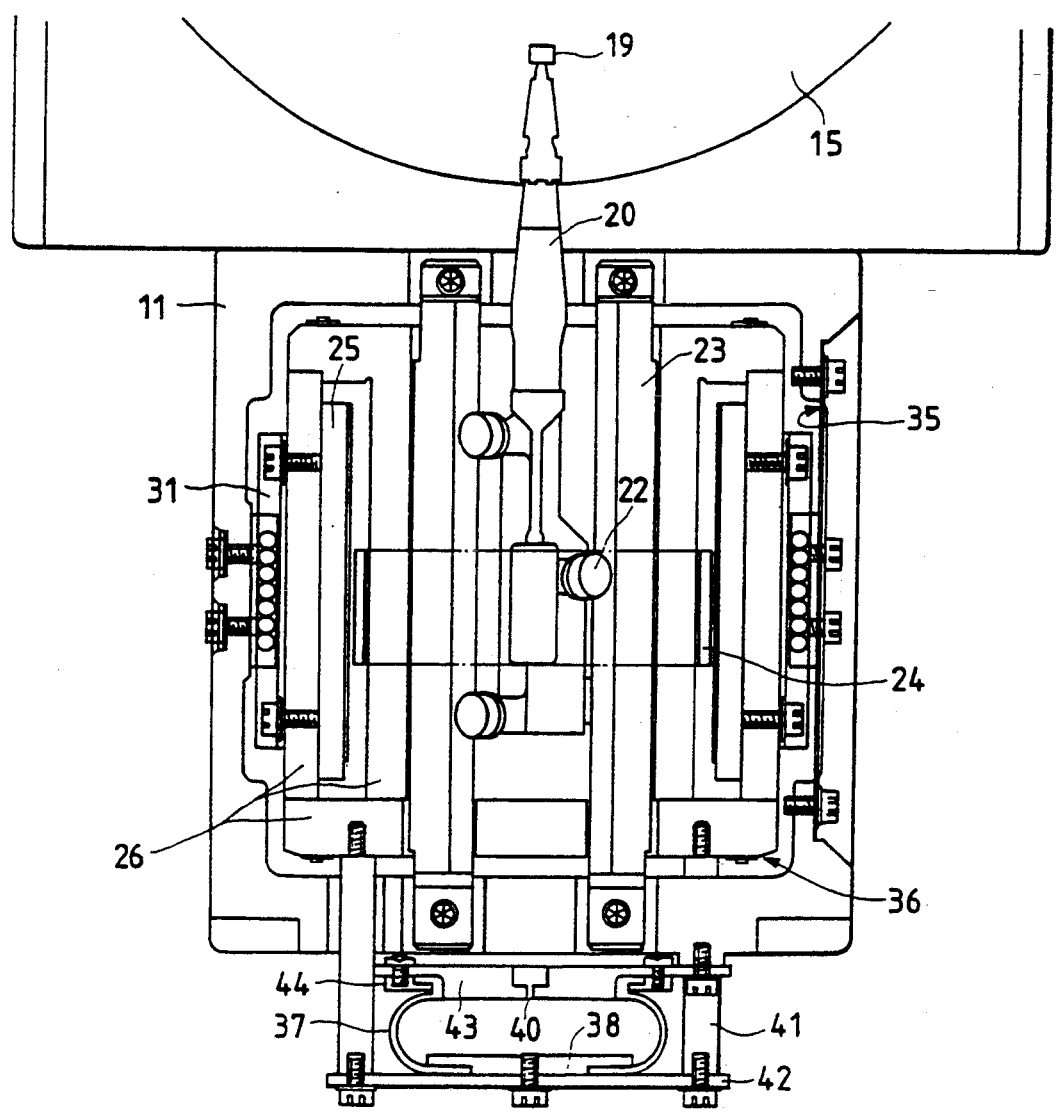
FIG. 3a is a top view illustrating the details of a carriage of the magnetic disk device and its associated members of the embodiment according to the present invention.

The disks 15 are fitted and fixed to the spindle 16 which is held by spindle bearings 17 of the housing 11. A spindle motor 18 is installed on the housing 11 and has its shaft coupled to the spindle 16. The heads 19 are attached to the ends of guide arms 20 via gimbals. The guide arms 20 are installed on the carriage 21 which has rollers 22 that roll on rails 23 supported on the housing 11, enabling the heads 19 to linearly move in a radial direction of the disks 15. The driving is accomplished by an actuator which causes the carriage 21 to linearly move utilizing the electromagnetic action created by a coil 24 and a magnet 25 (FIG. 3a). The coil 24 is incorporated in the carriage 21 and the magnet is mounted on a yoke 26.

The magnetic disk device further comprises a guide mechanism that moves the yoke 26 supporting the magnet in the direction in which the carriage 21 moves, a pneumatic spring 30 with a throttle 40 that attenuates vibration generated on the yoke 26 due to the reaction force of when the carriage 21 is moved by the actuator, and a spring 32 which restricts or regulates the relative positional relationship between the yoke 26 and the peripheral members.

Figure 3B:
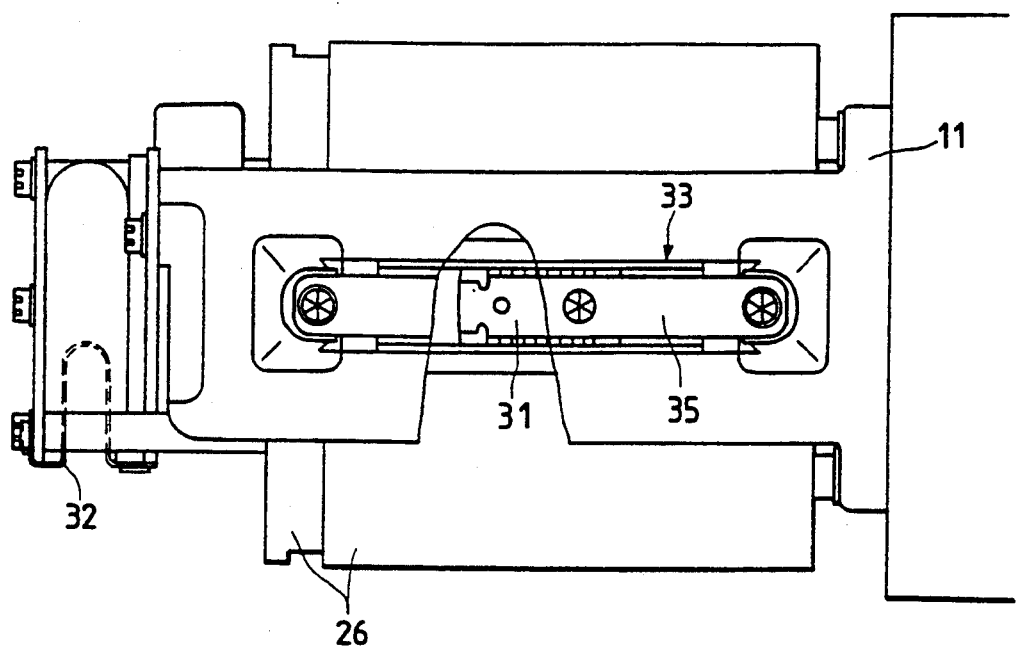

FIG. 3a and 3b illustrate the guide mechanism and the pneumatic damper with a throttle more concretely than the schematic diagrams of FIGS. 1 and 2.

The housing 11 is constituted of a spindle unit which contains the disks 15 and the like, and an actuator unit, that are coupled together by bolts (not shown).

The housing 11 on the actuator has a square cross section. The rails 23 are supported at both ends by the housing 11.

The yoke 26 is incorporated in the housing 11 via linear bearings 31 which, as shown in FIGS. 3a and 3b, decrease the thickness or the height of the housing 11 in the direction in which the disks 15 are stacked. The casing which holds needle rollers or balls of one linear bearing 31 is secured to the housing 11, and other is fixed to a leaf spring 35. The leaf spring 35 is disposed to cover an opening 33 (FIG. 3b) made in a side surface of the housing 11, and is secured at both ends to the housing 11 by bolts.

The leaf spring 35 prevents the generation of excess thermal stresses on the balls of the linear bearings and on the track surfaces, that results from the difference in the coefficients of linear expansion due to different materials or that results from the difference in the temperature distribution.

Stoppers 36 made of rubber or like material are attached to the moving ends of the yoke 26. The pneumatic spring 30 (FIG. 1) has a flexible hollow member 37 (FIG. 3a), a stationary member which is disposed on one side of the hollow member 37 and which is coupled to the housing 11, and a movable member which is disposed on the opposite side and is coupled to the yoke 26. Among them, the hollow member 37 is of a molded article of fluororubber having a thin cylindrical shape, with its side wall being curved and with both its ends open.

The movable member is constituted of a back plate 42 and a fixing member 38, and the hollow member 37 is fixed to the back plate 42 by the fixing member 38. The fixing member 38 is of a disk shape, is disposed inside the opening of the hollow member 37 to be in contact with the inner surface of the wall that forms the outside opening of the hollow member 37, and is secured to the back plate 42 by bolts. The movable member is coupled to the yoke 26 through a rod 41.

The stationary member is made up of a base plate 43 having a through hole with a throttle 40 at the center, and a ring 44. The base plate 43 is disposed in the hollow member 37 facing the yoke 26 in such a way as to be in contact with the inner surface of the wall forming the opening of the hollow member 37. The ring 44 is disposed to be in contact with the outer surface of the wall that forms the opening which faces the yoke 26. The ring 44 is fastened to the base plate 43 by bolts. The base plate 43 is secured to the housing 11 using another bolt.

The leaf spring 32 (FIG. 3b) uniformly maintains the gaps between the housing 11 and the magnetic circuit constituted of the magnet 25 and the yoke 26 even when a head disk assembly (hereinafter referred to as an HDA) is inclined. The leaf spring 32 further prevents the collision between the magnetic circuit and the housing 11, and maintains positions of the coil 24 and the magnet 25 relative to each other, so that the thrust of the carriage 21 is not decreased. The leaf spring 32 is disposed between the back plate 42 and the base plate 43 of the movable member (FIG. 3b).

If the HDA is not inclined but is maintained to be horizontal, the spring 32 is not necessary. When the HDA is inclined due to inclination of the floor on which the magnetic disk device is installed, the spring 32 is necessary to uniformly maintain the above-mentioned gaps and to prevent the creeping of the fluororubber of the hollow member 37.

In the magnetic disk device, the head 19 (FIG. 1) is positioned by rotating the spindle motor 18 and the disk 15 together with the spindle 16, providing a current through the coil 24 of the actuator, moving the carriage 21, and controlling the current that flows through the coil 24. When the head 19 performs the seeking operation, the yoke 26 receives the reaction force due to the electromagnetic action produced by the coil 24 and the magnet 25 (FIG. 3a).

In conventional devices in which a magnet or a coil is directly supported by the housing, the reaction force is directly transmitted to the housing and is further transmitted to a spindle via the spindle bearing that constitutes a drive mechanism for rotating disks. Since the spindle bearing has a relatively small rigidity, a spring-mass system is established in which the spindle bearing serves as a spring and the spindle serves as a mass, whereby the spindle and the disk resonate together. Since the spindle bearing has almost no viscosity, the resonance peak becomes considerably high.

In the magnetic disk device of the present invention, however, the linear bearings 31 release the reaction force generated by the seeking operation of the head 19. That is, the reaction force is not transmitted to the spindle 16, and no spindle vibration is generated, thus improving the positioning precision. Even when the seeking operation of the head generates a reaction force that is large enough to cause the resonance of the magnetic circuit which is made up of the magnet 25 and the yoke 26, a large damping force created by the throttle 40 of the pneumatic spring 30 quickly attenuates the resonance. As a result, no extra size is required for the amplitude of the magnet, and the gap between the magnetic circuit and other parts can be decreased, enabling the HDA to be realized in a small size at a reduced cost. In addition, the leaf spring 32 (FIG. 3b) disposed between the back plate 42 and the base plate 43 maintains the relative positions of the magnet 25 (FIG. 3a) and the coil 24, prevents interference between the yoke 26 and other parts, and absorbs any impact produced by the interference. Therefore, the head is positioned very precisely without being affected by the reaction force generated by the seeking operation of the head.

In this magnetic disk device, furthermore, the yoke 26 is supported by the housing 11 via linear bearings 31 and can move with small friction. Therefore, the magnetic circuit receives the frictional component of the reaction force that is generated by the seeking operation of the head. As a result, the component of force is only transmitted to the spindle 16 via the housing 11, and the spindle vibration is suppressed. Moreover, since the linear bearings 31 are nearly symmetrically positioned on both sides of the yoke 26, the vibration mode becomes nearly symmetrical and does not affect the head positioning precision. In addition, the magnetic disk device can be assembled in a small size since the linear bearings 31 are arranged together with the rail 23 of the carriage 21 in sufficiently large spaces on the sides of the carriage or on the upper and lower sides thereof.

The flexible hollow member 37 constituting the pneumatic spring 30 (FIG. 1) is prevented from being deformed in the lateral direction by the stationary member and the movable member that moves together with the magnetic circuit on the linear bearings 31. That is, deformation in the lateral direction is prevented without using any particular member, which enables the pneumatic spring 30 to be simply constructed in a compact size. Moreover, since a distortion due to the deformation is small, the reliability of the pneumatic spring is high and the life of it is long. Furthermore, the hollow member 37 is made of a fluororubber that generates very little gas. Hence, the interior of the housing can be maintained clean even when the damping is obtained by utilizing the air in the housing. The head and disk surfaces are not fouled.

The leaf spring 32 (FIG. 3b) maintains initial positions of the magnet 25, coil 24, magnetic circuit and housing. Therefore, even when the HDA supported by the vibration-isolating rubbers is incorporated under a tilted condition or even when the magnetic disk device as a whole is inclinedly installed, the thrust is not decreased by misalignment between the magnet 25 and the coil 24. The impact is not generated by interference between the magnetic circuit and the housing. Therefore the head positioning precision is not deteriorated.

Moreover, the leaf spring 35 prevents the increase of stresses of the linear bearings 31 and prevents the increase of frictional resistances thereof that derive from the difference in coefficient of thermal expansion or in temperature distribution between the housing 11 and the yoke 26. The leaf spring 35 absorbs the error (if any) in the assembling. Thus, the linear bearings 31 are brought into contact with the yoke 26, which enables the mounting to be carried out very easily.

The arrangement of the linear motor shown in FIGS. 3a and 3b can be adapted not only to a carriage mechanism of a magnetic disk device but also to an device which moves a member by using such a linear actuator. In this case, the coil (or the magnet) is secured to the movable member, and the magnet (or coil) is secured to the housing via linear bearings and a damping mechanism (for example, a pneumatic damper with a throttle).

Figure 4:
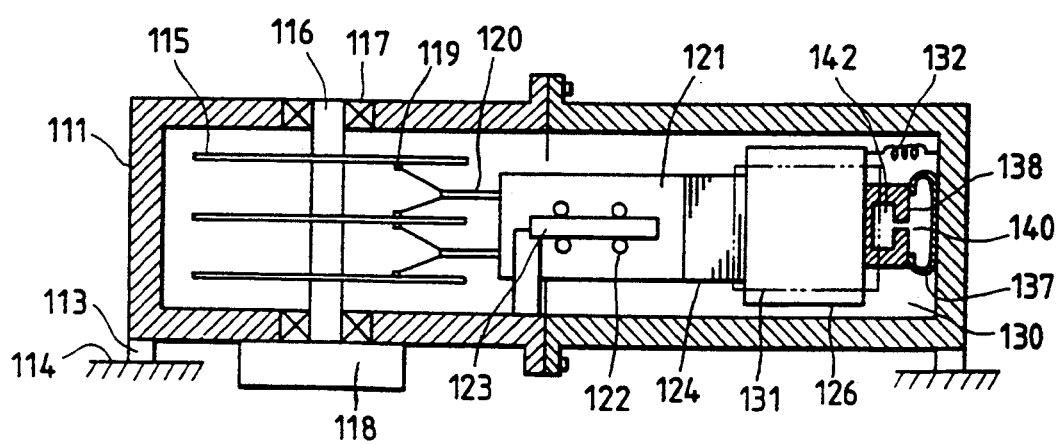
FIG. 4 is a sectional view illustrating the magnetic disk device according to another embodiment of the present invention.

(B) FIG. 4 illustrates another embodiment of a magnetic disk device in which the heads linearly move in a radial direction of the disks.

A housing 111 is installed on a device frame 114 via vibration-isolating rubbers 113. The housing 111 comprises two portions which are fastened together by bolts. The housing 111 contains disks 115, a drive mechanism which supports (116) and rotates (118) the disks 115, a head assembly including heads 119 that write information onto and read information from the disks 115, a carriage 121 that supports the head assembly, and mechanisms (122, 123) that guide the carriage 121 so that the heads 119 move on the disks 115.

The disks 115 are fitted and fastened to the spindle 116, which is held by spindle bearings 117 of the housing 111. A spindle motor 118 is installed on the housing 111 and has its shaft coupled to the spindle 116. The heads 119 are attached to guide arms 120 via gimbals. The guide arms 120 are installed on the carriage 121, which has rollers 122 that roll on rails 123 supported on the housing 111, enabling the heads 119 to move in a radial direction of the disks 115. The carriage 121 is moved by the actuator, i.e., moved by the electromagnetic action produced by the coil 124 and the magnet. The coil 124 is mounted on the carriage 121, and the magnet is mounted on the housing 111.

In this magnetic disk device, the yoke 126 supporting the magnet of the actuator is also mounted on the housing 111 via a guide mechanism such as linear bearings 131 having small frictional resistances so as to move in the same direction as that of the carriage 121. Vibration of the yoke 126 is attenuated by a pneumatic spring 130 disposed between it and the housing 111. The magnet is disposed so as not to interfere with the carriage 121 or the coil 124 on the carriage by utilizing a coil spring 132 that is disposed between the magnet and the housing 111. The pneumatic spring 130 comprises a stationary member constituted of the inner wall of the housing that is located on one side of the hollow member 137, and a movable member 138 disposed between the yoke 126 and the other side of the hollow member 137. Inside the movable member 138 are provided a space 142 and a through hole with a throttle 140 for the communication of the space 142 with the inside of the hollow member 137. The hollow member 137 is fastened to the housing 111 by a fastening member that is not shown. The movable member 138 is coupled to the yoke 126.

The heads 119 are positioned by rotating the spindle motor 118, and the disks 115 together with the spindle 116, causing a current to flow through the coil 124 of the actuator, moving the carriage 121, and controlling the current that flows through the coil 124.

When the heads 119 perform the seeking operation, the carriage 121 receives the reaction force since it gains a seeking force based on the electromagnetic action produced by the coil 124 and the magnet in the yoke 126.

Like those of FIGS. 1 and 2, the linear bearings 131 disposed in the direction in the planes of the disks 115 release the reaction force produced by the seeking operation of the heads, so that the reaction force transmitted to the spindle 16 via the housing 111 is reduced. Therefore, no spindle vibration is generated and the positioning precision is improved. Even when the seeking operation of the heads generates a reaction force that is large enough to cause resonance of the magnetic circuit which is made up of the magnet and the yoke 126, a large damping force created by the throttle 140 of the pneumatic spring 130 quickly attenuates the resonance. As a result, no extra size is required for the amplitude of the magnet, and the gap between the magnetic circuit and other parts can be decreased, enabling the HDA to be realized at a reduced cost and in a small size.

In addition, the coil spring 132 disposed between the yoke 126 and the housing 111 maintains the relative positions of the coil 124 and the magnet in the yoke 126, prevents interference between the yoke 126 and other parts, and absorbs any impact produced by the interference. Therefore, the heads are positioned with a very high precision without being affected by the reaction force generated by the seeking operation of the heads.

(B)[1]

FIG. 9 illustrates a detailed constitution of the device of FIG. 4. Same numbered members as those in FIG. 4 or other figures are explained in reference to those other figures.

This device has following features.

The stationary member of FIG. 9 is constituted of a back plate 12B and a fixing member 139, and the hollow member 137 is fixed to the back plate 12B by the fixing member 139. The fixing member 139 is of a disk shape, disposed inside the opening of the hollow member 137 to be in contact with the inner surface of the wall that forms the outside opening of the hollow member 137, and is secured to the back plate 12B by bolts. The movable member is coupled to the yoke 126 through a rod 141.

The movable member is made up of a base plate 143 having a through hole with a throttle 140 at the center, and a ring 144. The base plate 143 is disposed in the hollow member 137 facing the yoke 126 in such a way as to be in contact with the inner surface of the wall forming the opening of the hollow member 137. The ring 144 is disposed to be in contact with the outer surface of the wall that forms the opening which faces the yoke 126, and is fastened to the base plate 143 by bolts. The base plate 143 is secured to the rod 41 using other bolts.

The coil spring 132 uniformly maintains the gaps between the housing 111 and the yoke 126 even when a head disk assembly (an HDA) is inclined. The coil spring 132 further prevents a collision between the magnetic circuit and the housing 111, and maintains positions of the coil 124 and a magnet 125 relative to each other, so that the thrust of the carriage 121 (not shown) is not decreased. The coil spring 132 disposes a movable member between the back plate 12B and the housing 111.

If the HDA is not inclined but is maintained in a horizontal position, the spring 132 is not necessary. When the HDA is inclined due to inclination of the floor on which the magnetic disk device is installed, the spring 132 is necessary to uniformly maintain the above-mentioned gaps and to prevent the creeping of the fluororubber of the hollow member 137.

Figure 5:
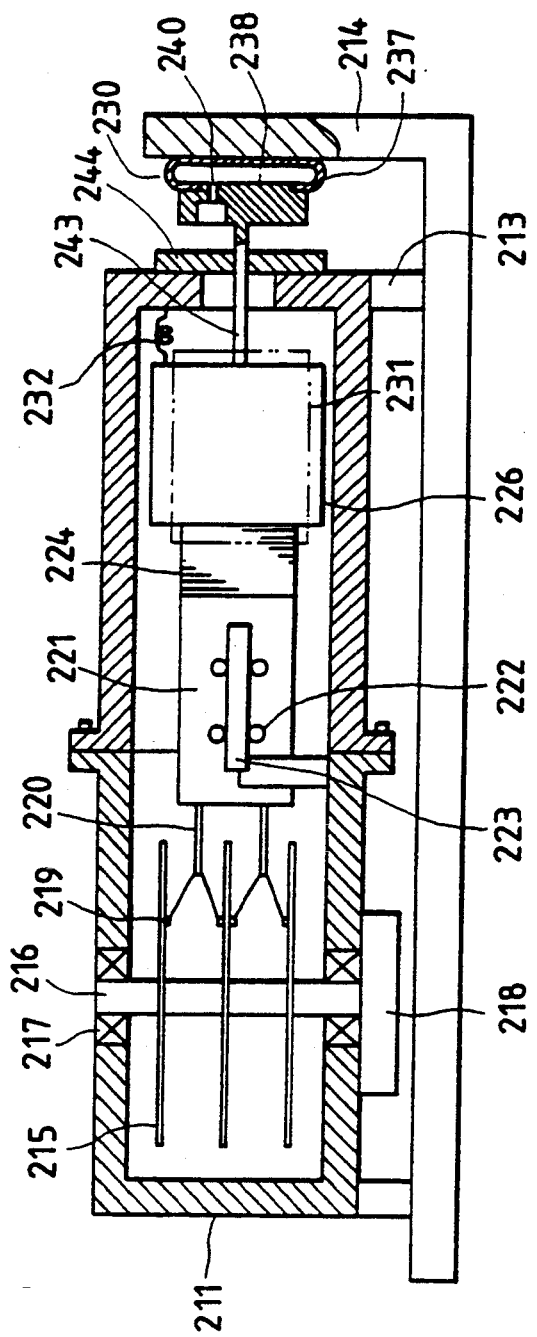
FIG. 5 is a sectional view illustrating the magnetic disk device according to a further embodiment of the present invention.

(C) FIG. 5 illustrates a further constitution of the magnetic disk device in which the heads attain linear motions in a radial direction of the disks.

A housing 211 is installed on a device frame 214 via vibration-isolation rubbers 213. The housing 211 comprises two portions which are fastened together by bolts. The housing 211 contains disks 215, a drive mechanism which supports (216) and rotates (218) the disks 215, a head assembly including heads that write information onto and read information from the disks 215, a carriage 221 that supports the head assembly, and a mechanism that guides the carriage so that the heads move on the disks 215.

The disks 215 are fastened to the spindle 216 which is held by spindle bearings 217 of the housing 211. A spindle motor 218 is installed on the housing 211 and has its shaft coupled to the spindle 216. The heads 219 are attached to guide arms 220 via gimbals. The guide arms 220 are installed on the carriage 221.

The carriage 221 has rollers 222 that roll on rails 223 supported by the housing 211, enabling the heads 219 to move in a radial direction of the disks 215. The carriage 221 is moved by the actuator, i.e., moved by the electromagnetic action produced by the coil 224 and the magnet. The coil 224 is mounted on the carriage 221, and the magnet is mounted on the housing 211.

In this magnetic disk device, the yoke 226 supporting the magnet of the actuator is also mounted on the housing 211 via a guide mechanism such as linear bearings 231 having small frictional resistances so as to move in the same direction as the carriage 221. Vibration of the yoke 226 is attenuated by a pneumatic spring 230 disposed between the frame 214 and the housing 211. The magnet is so disposed as not to interfere with the carriage 221 or the coil 224 on the carriage by utilizing a coil spring 232 that is disposed between the magnet and the housing 211. The pneumatic spring 230 is constituted of a flexible hollow member 237 and a movable member 238 located between the yoke 226 and an end of the hollow member 237 on the side opposite thereto, like that of the magnetic disk device described in connection with FIGS. 1 and 2.

The pneumatic spring 230 is disposed on the outside of the housing 211, and is mounted on the frame 214 of the magnetic disk device. The hollow member 237 is secured to the device frame 214 using a fastening member that is not shown, like the pneumatic spring in the magnetic disk device of FIGS. 1 and 2. The yoke 226 and the movable member 238 are fixed by a rod 243 that penetrates through an opening in the end wall of the housing 211 and a seal 244 attached to the housing 211.

The heads are positioned by rotating the spindle motor 218 and the disks 215 together with the spindle 216, flowing a current through the coil 224 of the actuator, moving the carriage 221, and controlling the current that flows through the coil 224. When the heads 219 perform the seeking operation, the carriage 221 receives the reaction force produced by the electromagnetic action caused by the coil 224 and the magnet in the yoke 226.

The linear bearings 231 disposed in directions of planes of the disks 215 release the reaction force generated by the seeking operation of the head, so that a reduced reaction force is transmitted to the spindle 216 via the housing 211. Therefore, no spindle vibration is generated and the positioning is improved. Even when the seeking operation of the heads generates a reaction force that is large enough to cause resonance of the magnetic circuit which is made up of the magnet and the yoke 226, a large damping force created by the throttle 240 of the pneumatic spring 230 quickly attenuates the resonance. As a result, no extra size is required for the amplitude of the magnet, and the gap can be decreased between the magnetic circuit and other parts, which enables the HDA to be realized at a reduced cost and in a small size.

In addition, the coil spring 232 disposed between the yoke 226 and the housing 211 maintains the relative positions of the coil 224 and the magnet in the yoke 226. The coil spring 232 prevents interference between the yoke and other parts, and absorbs impact produced by the interference. Therefore, the heads are positioned with a very high precision without harmful effect by the reaction force generated by the seeking operation of the heads.

In this magnetic disk device in which the pneumatic spring 230 is disposed on the outside of the housing 211, furthermore, the vibration of the pneumatic spring 230 is not transmitted to the spindle 216. Compared with the other above-mentioned embodiments, therefore, the heads 219 can be positioned with a further improved precision.

Figure 6:
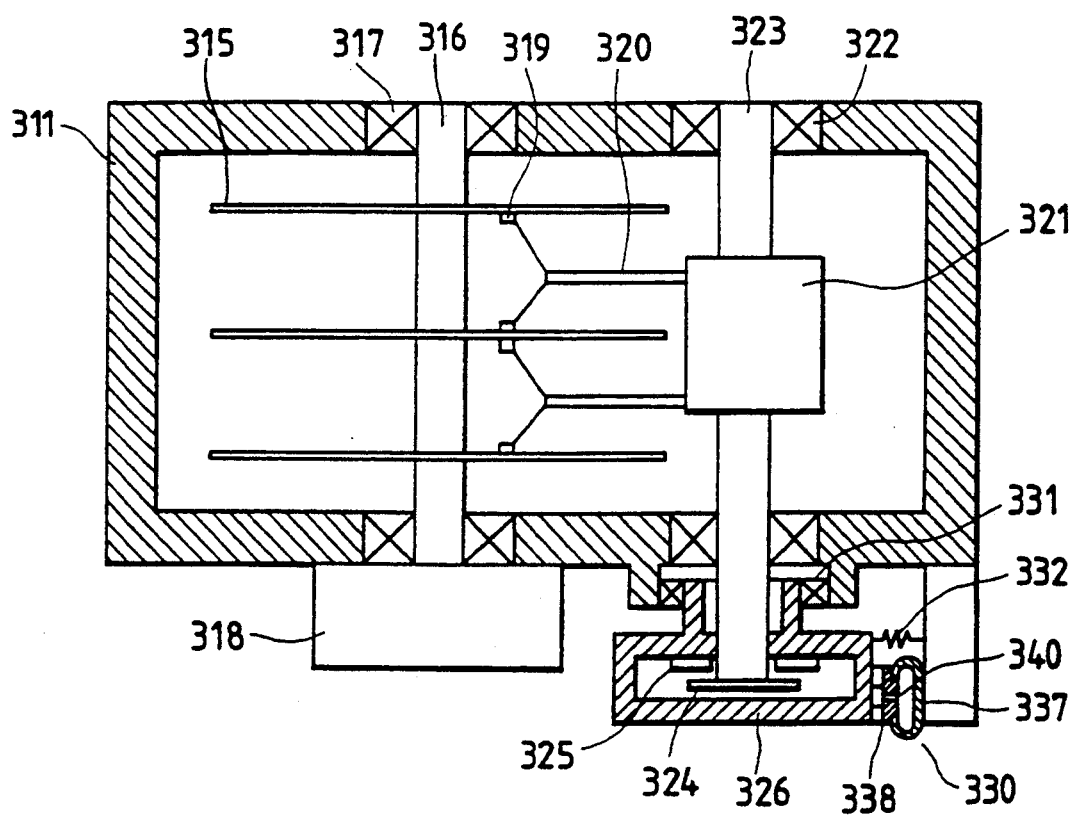
FIG. 6 is a sectional view illustrating the magnetic disk device according to an additional embodiment of the present invention.
Figure 7:
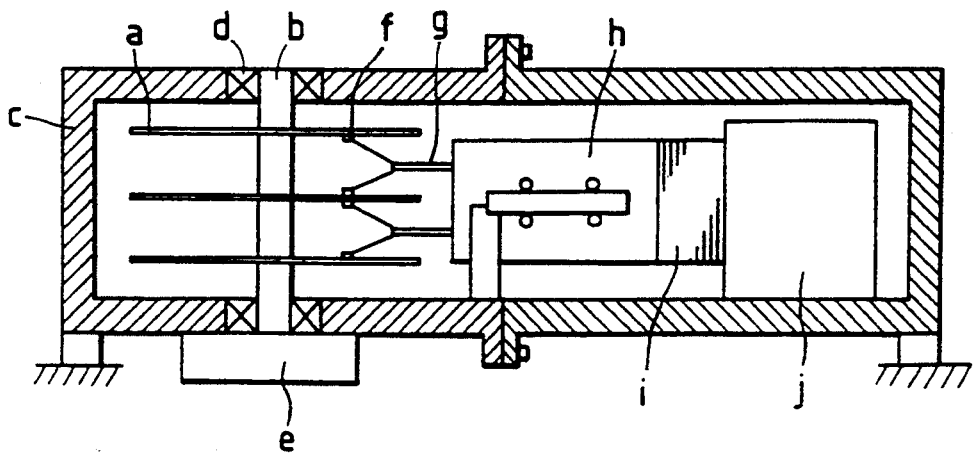
FIG. 7 is a sectional view illustrating a conventional magnetic disk device.
Figure 8:
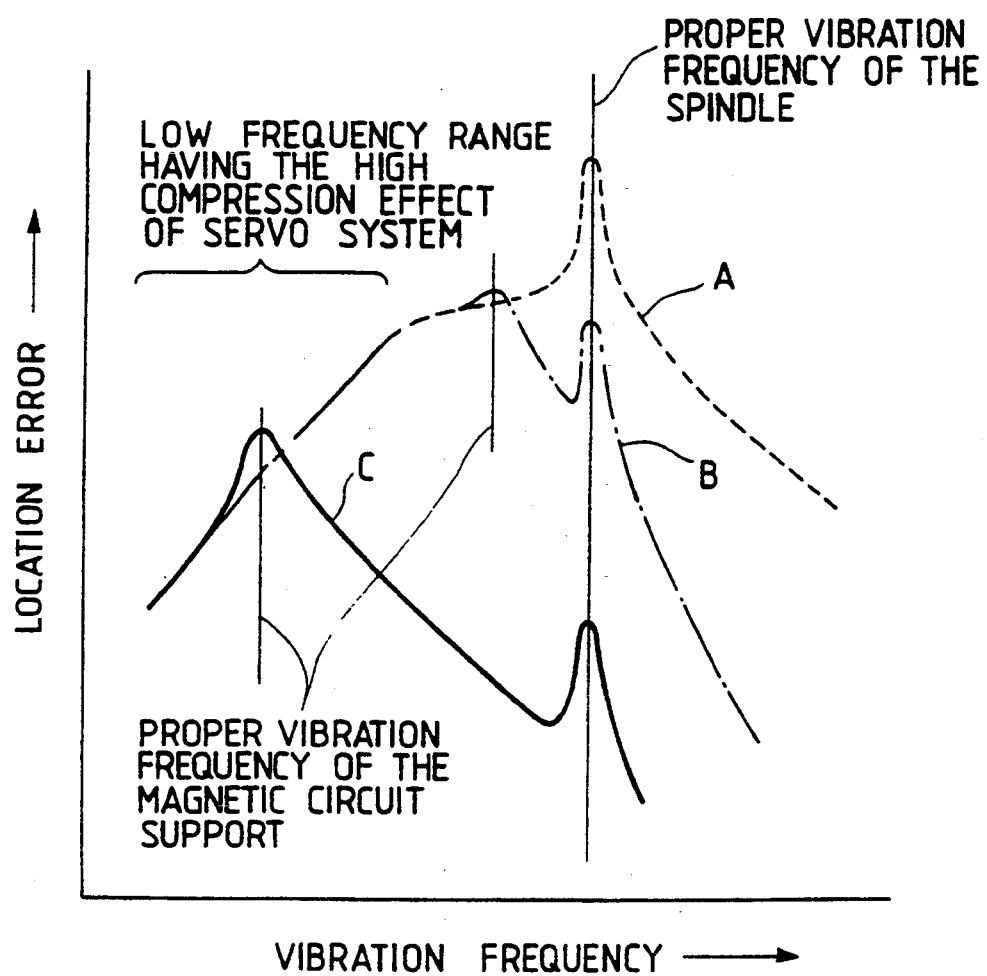
FIG. 8 are graphs for explaining the vibration characteristics of the magnetic disk device of prior arts and the present invention.

(D) FIG. 6 illustrates a magnetic disk device in which the heads are positioned by a swing arm that turns about an axis located on the outside of the disk.

A housing 311 comprises two portions which are not shown but which are connected together by bolts and are installed on the device frame via vibration-isolating rubbers.

The housing 311 contains disks 315, a drive mechanism which supports (316) and rotates (318) the disks 315, a head assembly including heads 319 that write information onto and read information from the disks 315, and a swing arm 321 that supports the head assembly.

The disks 315 are fixed to the spindle 316 which is held by spindle bearings 317 incorporated in the housing 311. The spindle motor 318 is installed on the housing 311 and has its shaft coupled to the spindle 316.

The heads 319 are attached to guide arms 320 via gimbals. The guide arms 320 are supported by the swing arm 321 which is disposed in the housing 311 in parallel with the spindle 316. The swing arm 321 is secured to the shaft 323 that is held by the housing 311 via bearings 322, and causes the heads 319 to move on the disk accompanying the rotation of the shaft 323.

The actuator which drives the swing arm 321 has a coil 324 that is mounted on the shaft 323 and a magnet 325 that is mounted on the yoke 326. The shaft 323 is rotated by the electromagnetic action produced by the coil 324 and the magnet 325, and the swing arm 321 swings.

In this magnetic disk device, the yoke 326 carrying the magnet 325 of the actuator is mounted on the housing 311 via a bearing 331 which is disposed coaxially with the shaft 323, and is allowed to swing in the same or opposite direction as the swing arm 321 swings.

The relative positions of the magnet 325 and the coil 324 on the shaft 323 are maintained by a coil spring 332 that is disposed between the yoke and the housing 311, so that the thrust will not be decreased.

Vibration of the yoke 326 when the head is positioned is attenuated by the pneumatic spring 330 that exists between yoke 326 and the housing 311. Unlike the magnetic disk device described in connection with FIGS. 1 and 2, in this case, the damping effect can be increased by filling the pneumatic spring 330 with an oil that does not easily degenerate, a resin, or any other solution.

The shaft 323 having the swing arm 321 extends to the outside of the housing 311 and has a coil 324 attached to an end thereof. The yoke 326 with the magnet 325 is held by the bearing 331 of the housing 311 coaxially with the shaft 323, and can be turned independently of the shaft 323.

The coil spring 332 is disposed between the yoke 326 and the housing 311. Like that of the magnetic disk device explained in conjunction with FIGS. 1 and 2, the pneumatic spring 330 is constituted of a flexible hollow member 337, an inner wall extending from the housing 311, and a movable member 338 located between the pneumatic spring and the yoke 326.

As in the magnetic disk device shown in FIGS. 1 and 2, the hollow member 337 is secured to the member that extends from the housing 311 by using a fastening member that is not shown. The movable member 338 is coupled to the yoke 326.

The heads are positioned by rotating the spindle motor 318 and the disk 315 together with the spindle 316, flowing a current through the coil 324 of the actuator, rotating the swing arm 321, and controlling the current that flows through the coil 324.

When the head 319 performs the seeking operation, the swing arm 321 swings due to the electromagnetic action created by the coil 324 and the magnet 325 and the arm receives the reaction force. In the magnetic disk device, the reaction force generated by the seeking operation of the head is released, so that a reduced reaction force may be transmitted to the spindle 316 via the housing 311. Therefore, no spindle vibration is generated and the positioning precision is improved. Even when the seeking operation of the heads generates the reaction force that is large enough to cause resonance of the magnetic circuit which is made up of the magnet and the yoke 326, a large damping force created by the throttle 340 of the pneumatic spring 330 quickly attenuates the resonance. In a case in which the HDA should be fabricated in a small size, therefore, the vibration which is caused by the reaction force produced during the seeking operation can be decreased.

The coil spring 332 disposed between the yoke 326 and the housing 311 maintains the relative positions of the magnet 325 and the coil 324. The spring 332 prevents interference between the yoke 326 and other parts, and absorbs impact produced by the interference. Therefore, the heads are positioned precisely without harmful effect by the reaction force generated by the seeking operation of the head.

Moreover, the yoke 326 held by the bearing 331 moves with a small friction therebetween. Additionally, the spindle 316 receives via the housing 311 only a frictional component of the reaction force which is received by the magnetic circuit. Therefore, the vibration of the spindle 316 is suppressed.

In an information storage device of the present invention as described above, a vibration in the rotary recording medium is decreased during the seeking operation of the detector head, and an impact is eliminated, so that the positioning of the detector heads is attained with a high precision.

The flexible hollow member 337 constituting the pneumatic spring 330 is disposed between a beam portion which is rotatable-connected to the housing 311 and a movable member 338 which is also rotatable-supported to the yoke 326.

The flexible hollow member 337 is made of a fluoro-rubber that generates very little gas and is disposed outside the housing 311. Therefore the interior of the housing 311 can be maintained clean and the head and disk surfaces are not fouled.

What is claimed is:

1. An information storage device comprising:
a rotary recording medium and a drive mechanism which supports and rotates said rotary recording medium;
an assembly including detectors which write information onto said rotary recording medium and read information from said rotary recording medium;
a first guide mechanism that guides said assembly such that said detectors move on said rotary recording medium, wherein said first guide mechanism linearly moves in a radial direction of said rotary recording medium;
a housing that supports said first guide mechanism;
a first magnetic field giving member that is disposed on said assembly;
a second magnetic field giving member that is disposed on a second guide mechanism, the second guide mechanism providing said second magnetic field giving member with a freedom of motion in either a same direction as or in an opposite direction to a direction in which said assembly moves; and a pneumatic spring which includes a flexible hollow member and attenuates motion of said second magnetic field giving member.

2. An information storage device according to claim 1, further comprising:
a resilient member which restricts a relative positional relationship between said housing and said second magnetic field giving member.

3. An information storage device according to claim 1, further comprising:
a resilient member which fixes said second guide mechanism on said housing.

4. An information storage device according to claim 1, wherein
said pneumatic spring acts substantially on a center of gravity of said second magnetic field giving member.

5. An information storage device according to claim 1, wherein
said pneumatic spring attenuates the motion of the second magnetic field giving member via a throttle hole formed in a portion of said pneumatic spring and a fluid in said pneumatic spring is moved through said throttle hole.

6. An information storage device according to claim 5, wherein
said fluid in said pneumatic spring is confined within an enclosure which is linked in an airtight manner to said pneumatic spring.

7. An information storage device according to claim 1, wherein
said pneumatic spring is disposed outside said housing.

8. An information storage device according to claim 1, wherein
said first guide mechanism turns about a point located outside of said rotary recording medium.

9. An information storage device according to claim 1, wherein the first magnetic field giving member comprises a coil and the second magnetic field giving member comprises a magnet.

10. An information storage device comprising:
a rotary recording medium and a drive mechanism which supports and rotates said rotary recording medium;
an assembly including detectors which write information onto said rotary recording medium and read information from said rotary recording medium;
a first guide mechanism that guides said assembly such that said detectors move on said rotary recording medium;
a housing that supports said first guide mechanism;
a coil disposed on said assembly and a magnet disposed on said housing;
a second guide mechanism that provides said magnet with a freedom of motion in either a same direction as or in an opposite direction to a direction in which said assembly moves;
a pneumatic spring which attenuates motion of said magnet, and which acts substantially on a center of gravity of said magnet.

11. An information storage device according to claim 10, further comprising:
a leaf spring which restricts a relative positional relationship between said housing and said magnet.

12. An information storage device according to claim 10, further comprising:
a coil spring which restricts a relative positional relationship between said housing and said magnet.

13. An information storage device according to claim 10, further comprising:
a leaf spring which fixes said second guide mechanism on said housing.

14. An information storage device according to claim 10, further comprising a resilient member which restricts a relative positional relationship between said housing and said magnet.

15. An information storage device comprising:
a rotary recording medium and a drive mechanism which supports and rotates said rotary recording medium;
an assembly including detectors which write information onto said rotary recording medium and read information from said rotary recording medium;
a first guide mechanism that guides said assembly such that said detectors move on said rotary recording medium, wherein said first guide mechanism linearly moves in a radial direction of said rotary recording medium;
a housing that supports said first guide mechanism;
a first magnetic field giving member that is disposed on said assembly;
a second magnetic field giving member that is disposed on a second guide mechanism, the second guide mechanism providing said second magnetic field giving member with a freedom of motion in either a same direction as or in an opposite direction to a direction in which said assembly moves; and
a pneumatic spring which includes a flexible hollow member and attenuates motion of said second magnetic field giving member, wherein said pneumatic spring is disposed outside said housing.

* * * * *